United States Patent
Hwang (10) Patent No.: US 9,155,366 B2
(45) Date of Patent: Oct. 13, 2015

(54) PORTABLE ELECTRONIC DEVICE SET

(71) Applicant: Twinhead International Corporation, Taipei (TW)

(72) Inventor: Chuen Shuh Hwang, Taipei (TW)

(73) Assignee: Twinhead International Corporation, Taipei (TW)

( * ) Notice: Subject to any disclaimer, the term of this patent is extended or adjusted under 35 U.S.C. 154(b) by 200 days.

(21) Appl. No.: 13/837,081

(22) Filed: Mar. 15, 2013

(65) Prior Publication Data

US 2014/0160676 A1  Jun. 12, 2014

(30) Foreign Application Priority Data

Dec. 7, 2012 (TW) .............................. 101146222 A (51) Int. Cl.
| | |
|---|---|
| G06F 1/16 | (2006.01) |
| H05K 5/00 | (2006.01) |
| H05K 7/00 | (2006.01) |
| F16M 11/00 | (2006.01) |
| F16M 11/04 | (2006.01) |
| A45C 11/00 | (2006.01) |
| A45C 13/26 | (2006.01) |
| F16M 13/00 | (2006.01) |
| F16M 13/04 | (2006.01) |

(52) U.S. Cl.
CPC .................. *A45C 11/00* (2013.01); *A45C 13/26* (2013.01); *F16M 13/00* (2013.01); *F16M 13/04* (2013.01); *G06F 1/166* (2013.01); *G06F 1/1628* (2013.01); *A45C 2011/003* (2013.01); *A45C 2200/15* (2013.01)

(58) Field of Classification Search
None
See application file for complete search history.

(56) References Cited

U.S. PATENT DOCUMENTS

| | | | | | |
|---|---|---|---|---|---|
| 4,895,231 | A | * | 1/1990 | Yamaguchi et al. | 190/115 |
| 6,017,106 | A | * | 1/2000 | Adams et al. | 312/223.2 |
| 6,087,952 | A | * | 7/2000 | Prabhakaran | 340/693.5 |
| 6,101,086 | A | * | 8/2000 | Kim et al. | 361/679.55 |
| 7,576,981 | B2 | * | 8/2009 | Kuo | 361/679.59 |
| 7,612,998 | B2 | * | 11/2009 | Fan et al. | 361/679.59 |
| 7,916,478 | B2 | * | 3/2011 | Tu et al. | 361/679.59 |
| 8,243,444 | B2 | * | 8/2012 | Kawada et al. | 361/679.59 |
| 8,405,981 | B2 | * | 3/2013 | Takemasa et al. | 361/679.59 |
| 8,451,603 | B2 | * | 5/2013 | Leggett | 361/679.58 |
| 8,508,937 | B2 | * | 8/2013 | Chen | 361/679.59 |
| 8,508,938 | B2 | * | 8/2013 | Luo | 361/679.59 |
| 8,848,366 | B2 | * | 9/2014 | Kawada et al. | 361/679.59 |
| 8,879,250 | B2 | * | 11/2014 | Franz et al. | 361/679.59 |
| 2005/0052831 | A1 | * | 3/2005 | Chen | 361/680 |
| 2006/0050471 | A1 | * | 3/2006 | Chen | 361/681 |
| 2008/0198543 | A1 | * | 8/2008 | Lord | 361/683 |
| 2009/0219677 | A1 | * | 9/2009 | Mori et al. | 361/679.03 |
| 2010/0027218 | A1 | * | 2/2010 | Lin et al. | 361/679.59 |
| 2011/0247959 | A1 | * | 10/2011 | Nelson | 206/525 |
| 2011/0267748 | A1 | * | 11/2011 | Lane et al. | 361/679.01 |
| 2011/0299231 | A1 | * | 12/2011 | Gaddis et al. | 361/679.01 |
| 2012/0020019 | A1 | * | 1/2012 | Chen et al. | 361/679.59 |
| 2012/0044624 | A1 | * | 2/2012 | Hoffman et al. | 361/679.21 |
| 2012/0106043 | A1 | * | 5/2012 | Murakata et al. | 361/679.01 |

(Continued)

*Primary Examiner* — Hoa C Nguyen
*Assistant Examiner* — Xanthia C Cunningham
(74) *Attorney, Agent, or Firm* — Alston & Bird LLP (57) ABSTRACT

A portable electronic device set is disclosed and includes a portable electronic device and an auxiliary assembly. The portable electronic device has an operating surface. The auxiliary assembly includes a frame body sitting on one side with respect to the operating surface of the portable electronic device. The frame body forms a holder extending outwardly from one sidewall of the frame body.

13 Claims, 5 Drawing Sheets

(56) References Cited

U.S. PATENT DOCUMENTS

| | | | |
|---|---|---|---|
| 2012/0243152 A1* | 9/2012 | Kawada et al. | 361/679.01 |
| 2012/0257342 A1* | 10/2012 | Shindo et al. | 361/679.02 |
| 2013/0092811 A1* | 4/2013 | Funk et al. | 248/371 |

* cited by examiner

PORTABLE ELECTRONIC DEVICE SET

CROSS-REFERENCE TO RELATED APPLICATION

This application claims the benefit of Taiwan Patent Application No. 101146222, filed on Dec. 7, 2012, in the Taiwan Intellectual Property Office, the disclosure of which is incorporated herein in its entirety by reference.

BACKGROUND OF THE INVENTION

1. Field of the Invention

The invention relates to a portable electronic device set, and more particularly to a portable electronic device set that disposes a portable auxiliary assembly to a rear portion of a portable electronic device.

2. Description of the Related Art

Modern technology is becoming more advanced day by day. Electronic products are continuously innovated and developed. In the past, desktop computers that are inconvenient to carry gradually evolved into laptop computers having heavier weight and then further evolved into electronic devices (i.e. tablet computers) that are capable of being conveniently carried. Tablet computers have provided unprecedented convenience for people. When a user needs to receive and send mails, prepare presentation slides and process information of e-commerce or browse internet and play games to pass time, a tablet computer could process the foregoing activities for the user.

However, in accordance with the manner of operating portable electronic devices, the user needs to use his/her hands to support the portable electronic device. The area of the portable electronic device is usually larger than the palm. It may not be easy for the user to support the center (or center of gravity) of the tablet computer and the loading on the hands increase. Therefore, during excessively use (time spent holding the device is too long) of the portable electronic device, the hands may ache and experience discomfort and affect the quality of using the portable electronic device.

In addition, if the portable electronic device is placed on an inclined surface, although the portable electronic device does not need to be supported by hands, the portable electronic device may easily drop to the ground under shaking or vibrating conditions. Hence the service life of the portable electronic device may be reduced due to frequent dropping. Therefore, an innovative portable electronic device capable of being easily carried and held by the hands and stably supported at a fixed angle is required.

SUMMARY OF THE INVENTION

Therefore, upon the foregoing shortcomings, it is a primary objective of the present invention to provide a portable electronic device set to overcome the problem that the conventional portable electronic devices may not be easily gripped.

To achieve the foregoing objective, a portable electronic device set is provided and comprises a portable electronic device and an auxiliary assembly. The auxiliary assembly comprises a frame body detachably disposed to a rear region of the portable electronic device. The frame body is outwardly extended from a side wall to form a non-deformable gripping portion.

Preferably, the frame body is in a shape of a horse hoof. The gripping portion is outwardly extended from the side wall relative to the opening of the frame body. The auxiliary assembly can comprise a fitting member, wherein two ends of the fitting member can be connected with two sides of the opening of the frame body.

Preferably, the fitting member can comprise a flexible band body and an intermediate body. Two ends of the flexible band body can be connected to the frame body. The intermediate body can be movably fitted to the flexible band body.

Preferably, the gripping portion can further comprise a flexible layer. The flexible layer can encapsulate the gripping portion.

According to the objective of the invention, a portable electronic device set is further provided and comprises a portable electronic device, a data processing device, a communication interface and an auxiliary assembly. The portable electronic device comprises a plurality of connection ports and a plurality of card slot and has an operating surface. The data processing device is electrically connected to the portable electronic device. The communication interface communicates with the data processing device and the portable electronic device. The auxiliary assembly comprises the frame body disposed to a surface of the portable electronic device relative to the operating surface. The frame body is outwardly extended from a side wall to form a non-deformable gripping portion.

Preferably, the frame body is a horse hoof shape. The gripping portion can be outwardly extended from the side wall relative to the opening of the frame body. The auxiliary assembly further comprises a fitting member, wherein its two ends are connected with two sides of the opening of the frame body.

Preferably, the fitting member can comprise the flexible band body and the intermediate body. Two ends of the flexible band body can be connected to the frame body. The intermediate body can be movably fitted on the flexible band body.

Preferably, the gripping portion further comprises a support rack. The frame body is disposed with at least one pivot portion corresponding to the support rack. The support rack is movably pivoted to the pivot portion.

Preferably, the support rack can be a horse hoof shape. The opening of the support rack is facing towards the gripping portion, thereby corresponding to the shape of the support rack. When the number of the pivot portions is two, two sides of the opening of the support rack can be respectively pivoted to each of the pivot portions.

Preferably, the support rack can further comprise a position limiting member fitted to the support rack and located to a side relative to the opening of the support rack. A side of the position limiting member can be connected to the frame body.

Preferably, the auxiliary assembly set further comprises at least one connection member. The connection member is disposed to at least one corner of the frame body.

Preferably, the auxiliary assembly set further comprises a harness. When the number of the connection members is two, two ends of the harness can be connected with two connection members of two adjacent corners of the frame body.

Preferably, the surface of the portable electronic device can have a plurality of first fastening portions. The frame body has a plurality of second fastening portions corresponding to the plurality of first fastening portions. The plurality of fastening members corresponding to the plurality of first fastening portions and the plurality second fastening portions are used to respectively pass through and connect each first fastening portion with each second fastening portion to each other.

According to the portable electronic device set of the invention, it has one or more advantages:

1. The portable electronic device set allows the user to conveniently carry the portable electronic device by means of gripping through the gripping portion of the frame body. In addition, by combining the harness with the connection members disposed to the corner of the frame body, the user can carry the portable electronic device on his/her shoulder to enhance the convenience of carrying the portable electronic device.

2. The portable electronic device can allow his/her hands to be inserted into the fitting member through the fitting member of the auxiliary assembly such that the hands do not need to grip the portable electronic device through a gripping manner and can easily support the center of the portable electronic device, thereby reducing the loading of the hands.

3. The portable electronic device set supports the portable electronic device at an angle through the support rack of the auxiliary assembly and the position limiting member. Since the support rack is pivoted to the pivot portion of the frame body and the frame body is combined with the portable electronic device, the possibility of dropping the portable electronic device due to shaking and vibration can be reduced.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
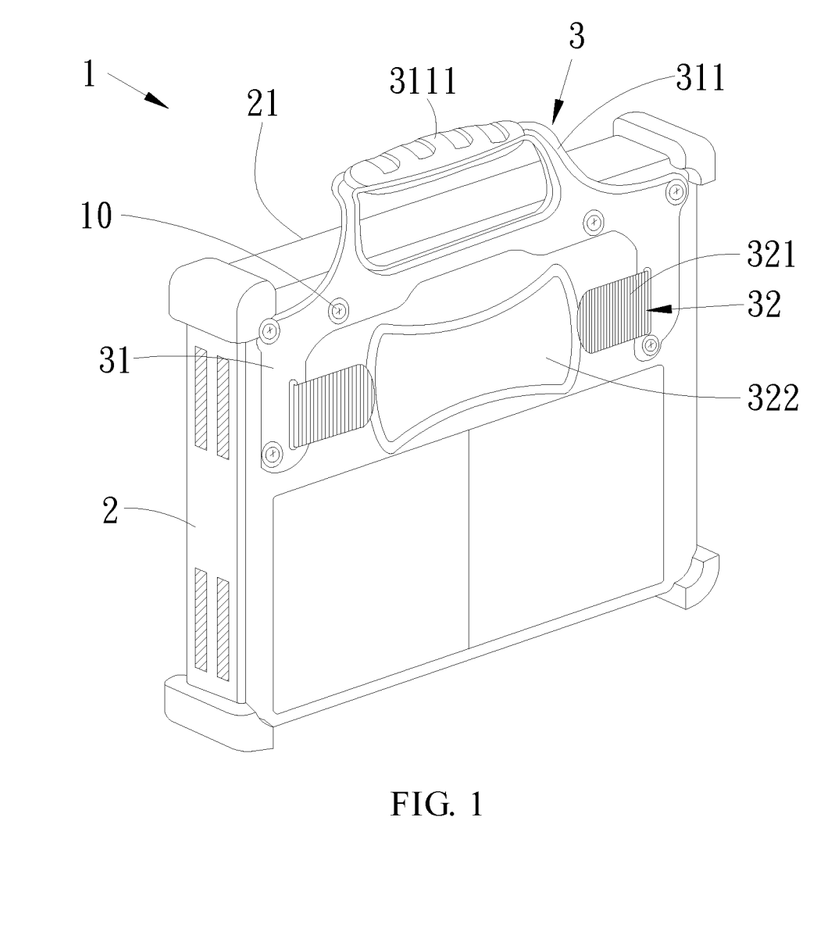
FIG. 1 is a first schematic diagram of a portable electronic device set of the invention.
Figure 2:
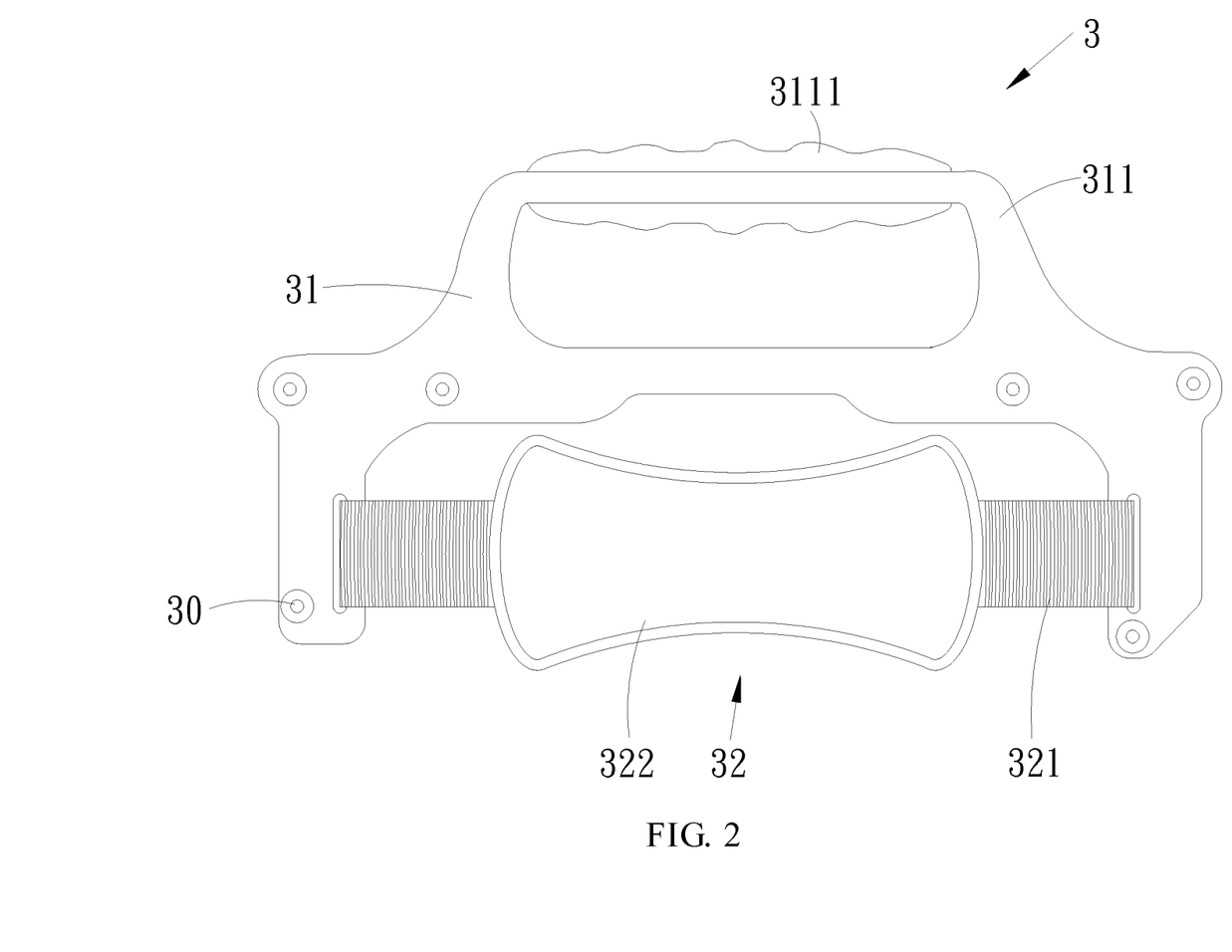
FIG. 2 is a first schematic diagram of an auxiliary assembly of the invention.

With reference to FIG. 1 and FIG. 2, FIG. 1 is a first schematic diagram of a portable electronic device set according to the invention; and FIG. 2 is a first schematic diagram of an auxiliary assembly according to the invention. As shown in the figures, the portable electronic device set 1 comprises a portable electronic device 2 and an auxiliary assembly 3. The portable electronic device 2 can be a tablet computer, a laptop or any portable electronic device that has an operating surface 21. The operating surface 21 is a screen of the portable electronic device 2 herein. The auxiliary assembly 3 comprises a frame body 31 capable of being detachably disposed to a surface, which is relative to the operating surface 21 of the portable electronic device 2, as a rear region of the portable electronic device 2. One of the side walls of the frame body 31 is outwardly extended to form a non-deformable gripping portion 311. For example, the frame body 31 can be in a horse hoof shape, so that the gripping portion 311 can be outwardly extended from the side wall at the horse hoof opening of the frame body 31, and the gripping portion 311 further comprises a flexible layer 3111. The flexible layer 3111 can be made of elastic materials such as rubbers and is encapsulated on the gripping portion 311. The external surface of the flexible layer 3111 is disposed with a plurality of wave-like structures corresponding to a shape of the hands of a user such that the user can conveniently grip the structure.

The foregoing structure is to carry the electronic device having the foregoing functions when the user would like to process data documents, communication, internet browsing or play games. To conveniently carry the electronic device, the electronic device is placed into a bag body corresponding to the electronic device or the backpack having a harness. However, the electronic device placed in the bag or the backpack needs to be taken out while in use, and it may cause inconvenience during the usage. Therefore, the portable electronic device set 1 of the invention is to dispose the auxiliary assembly 3 at the rear surface of the portable electronic device 2 and is joined with the portable electronic device 2 to achieve the purpose of allowing the user to directly use the portable electronic device 2 at will by omitting the motion of taking the portable electronic device 2 out from the bag or backpack during use. The disposition of the gripping portion 311 is to be gripped by the user, and the flexible layer 3111 can increase comfort and facilitate gripping and carrying by the user, wherein the surface of the portable electronic device 2 can have a plurality of the first fastening portions (the portion is covered by the frame body 31 and a fastening member 10 and is not shown in the figure), and the frame body 31 can have a plurality of second fastening portions 30 corresponding to the plurality of first fastening portions. A plurality of fastening members 10 (i.e. screws) corresponding to the first fastening portions and the second fastening portions 30 respectively passing through each first fastening portion and each second fastening portion 30.

The auxiliary assembly 3 further comprises a fitting member 32, in which its two ends can be connected at two sides of the horse hoof opening of the frame body 31. The fitting member 32 can include a flexible band body 321 and an intermediate body 322. Two ends of the flexible band body 321 can be connected at two sides of the horse hoof opening of the frame body 31. The intermediate body 322 can be movably fitted on the flexible band body 321. However, the fitting member 32 is not limited to the foregoing structure. The quantity of the flexible band body 321 can be two. One end of each flexible band body 321 is respectively connected at two sides of the horse hoof opening of the frame body 31 while another end of each flexible band body 321 is respectively connected at two ends of the intermediate body 322.

With the foregoing fitting member 32, the user can insert one of his/her hands between the fitting member 32 and the portable electronic device 2 to support the rear surface of the portable electronic device 2 by his/her palm, so that the user can conveniently use the portable electronic device 2 at a stable manner. In the past, the user always uses the hand to grasp the portable electronic device 2 during the usage. The foregoing behavior does not easily support the center of gravity of the portable electronic device 2 and increases the loading on the hands when grasping the portable electronic device 2 and causes aches, which affect the quality during the usage process. Therefore, the fitting member 32 provides a function capable of inserting a palm having any size and thickness through the feature of the flexible band body 321 having flexibility to allow the palm of the user to easily support the center of gravity of the portable electronic device 2, such that the loading of the hands can be reduced to prevent hands from feeling discomfort.

Figure 3:
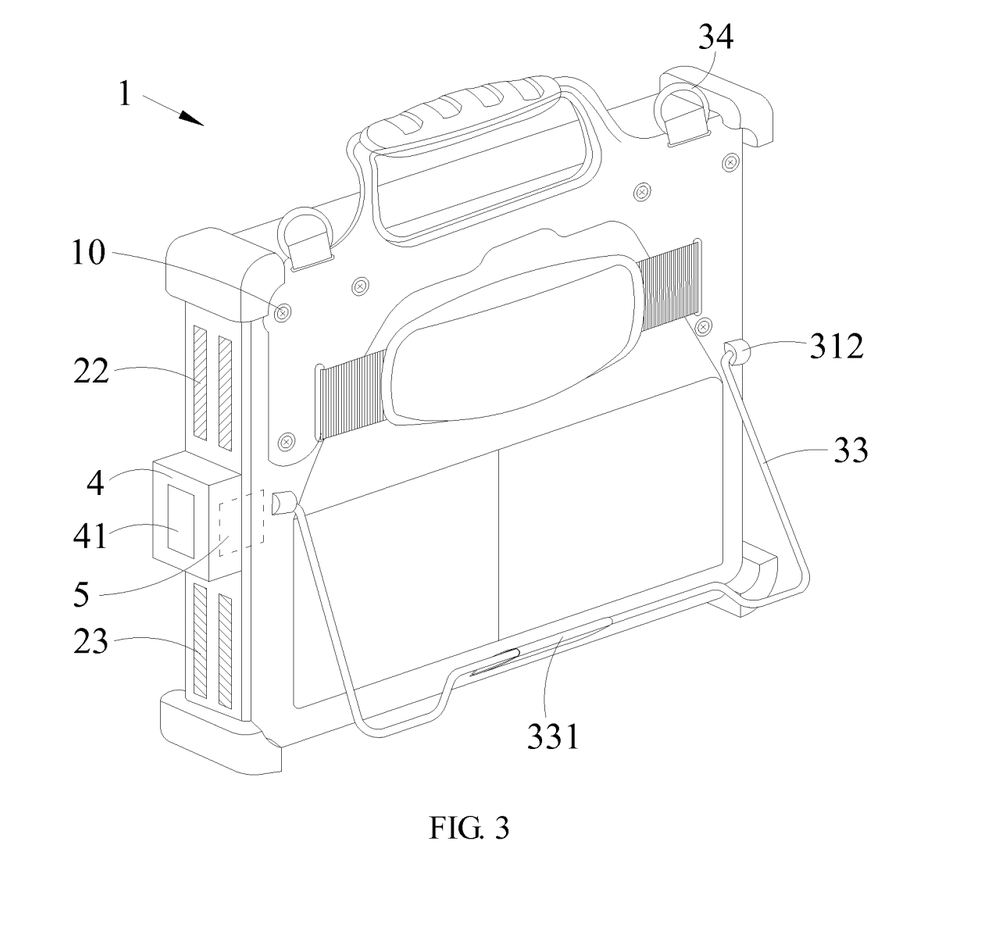
FIG. 3 is a second schematic diagram of a portable electronic device set of the invention.
Figure 4:
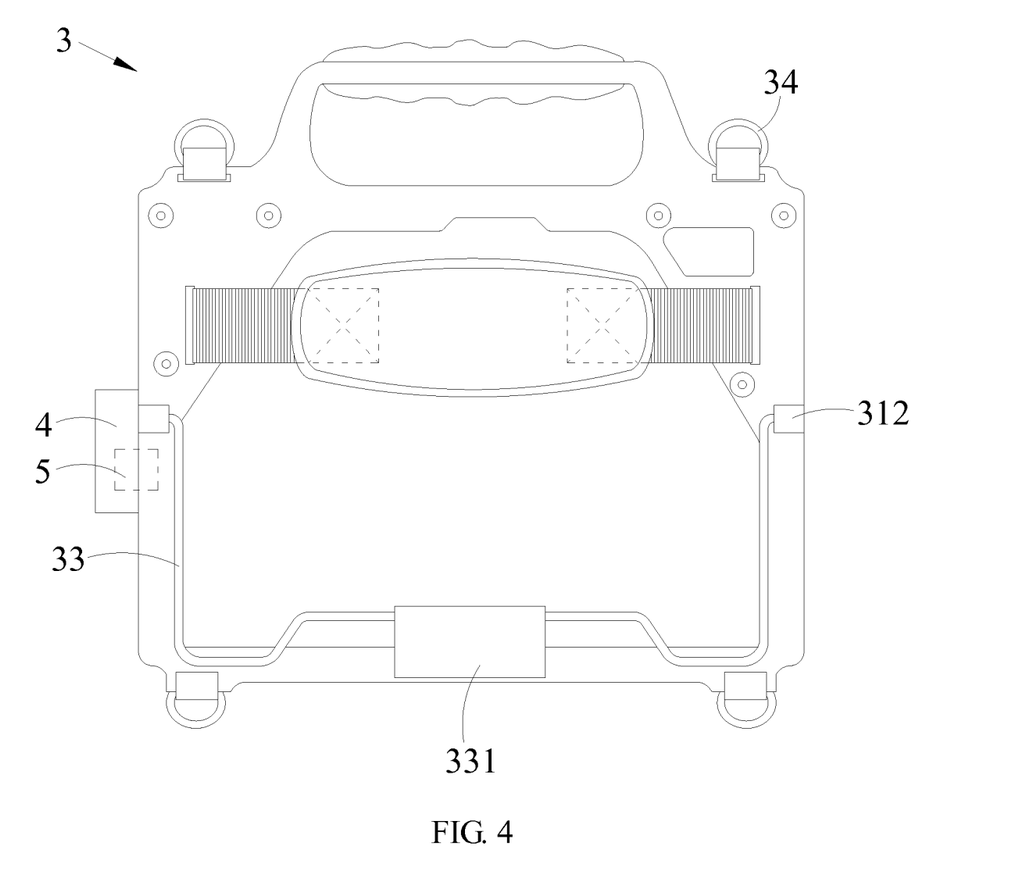
FIG. 4 is a second schematic diagram of an auxiliary assembly of the invention.
Figure 5:
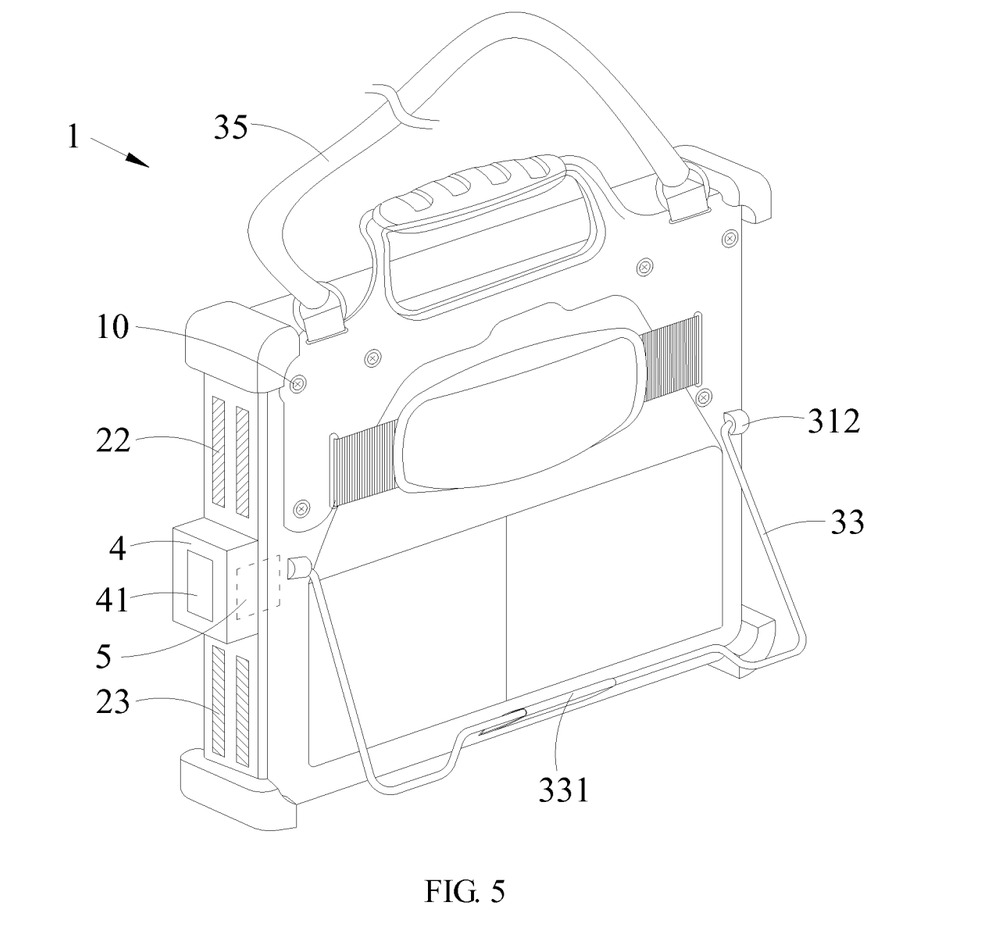
FIG. 5 is a third schematic diagram of a portable electronic device set of the invention.

With reference to FIG. 3 to FIG. 5, FIG. 3 is a second schematic diagram of a portable electronic device set of the invention; FIG. 4 is a second schematic diagram of an auxiliary assembly of the invention; and FIG. 5 is a third schematic diagram of a portable electronic device set of the invention.

As shown in the figures, by comparing with the foregoing depiction, the portable electronic device set 1 further comprises a data processing device 4 and a communication interface 5. In addition, the portable electronic device 2 further comprises a plurality of connection ports 22 and a plurality of card slots 23 in order to perform electrical connection together with peripheral electronic devices. The data processing device 4 is electrically connected to the portable electronic device 2, but not limiting its physical disposition. The data processing device 4 can be a scanner, such as fingerprint or bar code scanner, a magnetic card reader or other similar data processing devices, capable of scanning graphic marks to further transfer the graphic marks as a proper electrical signal. Simply, the data processing device 4 can obtain a signal (i.e. optical patterns), and the signal is converted into a digital signal that is transmitted to the portable electronic device 2 by passing through the communication interface 5. The data processing device 4 further comprises a detection region 41 for detecting and scanning graphic marks.

Further, when placing the portable electronic device 2 on an inclined face, although it does not need to be supported by hands, the portable electronic device 2 may easily fall to the ground under shaking or vibrating conditions. The service life of the portable electronic device 2 may be reduced if it falls frequently to the ground. Due to the foregoing reason, the auxiliary assembly 3 of the invention is further increased with a support rack 33 in addition to the frame body 31 and the fitting member 32 previously mentioned. The frame body 31 is disposed with at least a pivot portion 312 corresponding to the support rack 33. The support rack 33 is movably pivoted to the pivot portion 312. In another word, the support rack 33 rotates an angle by taking the pivot portion 312 as an axis. For example, the support rack 33 can be a horse hoof shape, and the horse hoof opening of the support rack 33 is toward the gripping portion 311, thereby corresponding to the horse hoof shape of the support rack 33. The number of the pivot portion 312 can be two. Two sides of the opening of the support rack 33 can be respectively pivoted to each pivot portion 312, so that the support rack 33 rotates an angle by taking the pivot portion 312 as an axis. Therefore, by taking the support rack 33 and a side of the portable electronic device 2 relative to the support rack 33 as a fulcrum point, the portable electronic device set 1 can be supported and fastened at an angle and used by the user.

However, since the support rack 33 is movably pivoted to the pivot portion 312, the rotational angle range is not limited, and it is unable to be fastened at an angle. Consequently, the support rack 33 may easily slide under shaking or vibrating conditions, and hence, the user is unable to use the portable electronic device 2 at a stable state.

Therefore, the support rack 33 can further comprise a position limiting member 331 fit on the support rack 33 and located at a side of the support rack 33 relative to an opening of the support rack 33. A side of the position limiting member 331 can be connected to the frame body 31. Accordingly, the support rack 33 can be limited to rotate within a restricted range to further limit its rotating angles to prevent the portable electronic device set 1 from losing balance due to excessive rotational angles, incapable of standing.

In addition, the auxiliary assembly 3 further comprises at least one connection member 34. The connection member 34 is disposed to at least one corner of the frame body 31 and capable of connecting to a hanging decoration. The connection member 34 is also connected to the harness 35, when the number of the connection member 34 is two, the two ends of the harness 35 are connected with two connection members 34 of two near corners of the frame body 31. Accordingly, when the user is unable to grip the portable electronic device set 1 due to some reason, the portable electronic device set can be carried on his/her shoulder to further increase the carrying diversity.

While the means of specific embodiments in the present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A portable electronic device set comprising:
a portable electronic device; an auxiliary assembly comprising:
a frame body detachably disposed to a rear region of the portable electronic device, the frame body outwardly extended from one side wall to form a non-deformable gripping portion; and a support rack, wherein the frame body is disposed with at least one pivot portion corresponding to the support rack, and the support rack is movably pivoted to the pivot portion.

2. The portable electronic device set of claim 1, wherein the frame body is in a shape of a horse hoof, and the gripping portion is outwardly extended from the side wall relative to an opening of the frame body, and the auxiliary assembly further comprises a fitting member, and two ends of the fitting member are connected at two sides of the opening of the frame body.

3. The portable electronic device set of claim 2, wherein the fitting member comprises a flexible band body and an intermediate body, and two ends of the flexible band body are connected to the frame body, and the intermediate body is movably fitted on the flexible band body.

4. The portable electronic device set of claim 1, wherein the gripping portion further comprises a flexible layer for encapsulating the gripping portion.

5. A portable electronic device set comprising:
a portable electronic device comprising a plurality of connection ports and a plurality of card slots and having an operating surface; a data processing device electrically connected to the portable electronic device; a communication interface for communicating between the data processing device and the portable electronic device; and an auxiliary assembly comprising:
a frame body disposed to a surface of the portable electronic device corresponding to the operating surface of the portable electronic device, the frame body outwardly extended from one side wall of the frame body to form a non-deformable gripping portion; and a support rack, wherein the frame body is disposed with at least one pivot portion corresponding to the support rack, and the support rack is movably pivoted to the pivot portion.

6. The portable electronic device set of claim 5, wherein the frame body is a horse hoof shape, and the gripping portion is outwardly extended from the side wall relative to an opening of the frame body, and the auxiliary assembly further comprises a fitting member, and two ends of the fitting member are connected at two sides of the opening of the frame body.

7. The portable electronic device set of claim 6, wherein the fitting member comprises a flexible band body and an intermediate body, and two ends of the flexible band body are connected to the frame body, and the intermediate body is movably fitted on the flexible band body.

8. The portable electronic device set of claim 5, wherein the gripping portion further comprises a flexible layer, and the flexible layer encapsulates the gripping portion.

9. The portable electronic device set of claim 5, wherein the support rack is a horse hoof shape, and an opening of the support rack is facing towards the gripping portion, thereby corresponding to the shape of the support rack, and when the number of the pivot portions is two, two sides of the opening of the support rack are respectively pivoted to each of the pivot portions.

10. The portable electronic device set of claim 9, wherein the support rack further comprises a position limiting member fitted on the support rack and located at a side of the support rack relative to the opening of the support rack, and a side of the position limiting member is connected to the frame body.

11. The portable electronic device set of claim 5, wherein the auxiliary assembly further comprises at least one connection member, and the connection member is disposed to at least one corner of the frame body.

12. The portable electronic device set of claim 11, wherein the auxiliary assembly further comprises a harness, and when the number of the connection members is two, two ends of the harness are connected with the two connection members of two adjacent corners of the frame body.

13. The portable electronic device set of claim 5, wherein the surface of the portable electronic device has a plurality of first fastening portions, and the frame body has a plurality of second fastening portions corresponding to the plurality of the first fastening portions, and a plurality of fastening members corresponding to the plurality of first fastening portions and the plurality of second fastening portions are used to respectively pass through and connect each first fastening portion with each second fastening portion to each other.

* * * * *